M. C. OVERMAN.
PNEUMATIC TIRE.
APPLICATION FILED JULY 22, 1914.
1,177,048.
Patented Mar. 28, 1916.
2 SHEETS—SHEET 1.
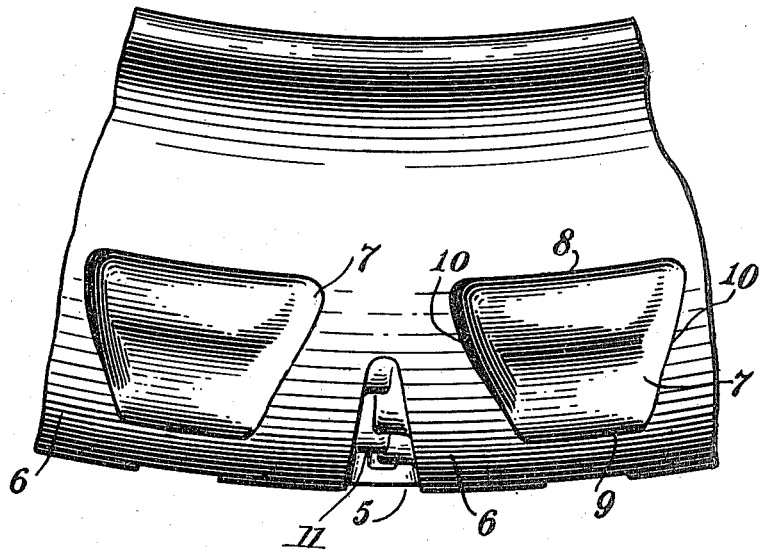
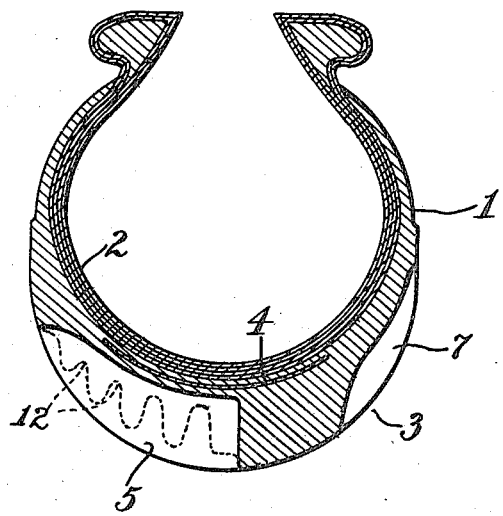
Attest:
Robert S. Mayer
Howell D. Boyd
Inventor:
by Max Cyrus Overman
E. W. Scherr Jr. Atty M. C. OVERMAN.
PNEUMATIC TIRE.
APPLICATION FILED JULY 22, 1914.
1,177,048.
Patented Mar. 28, 1916.
2 SHEETS—SHEET 2.
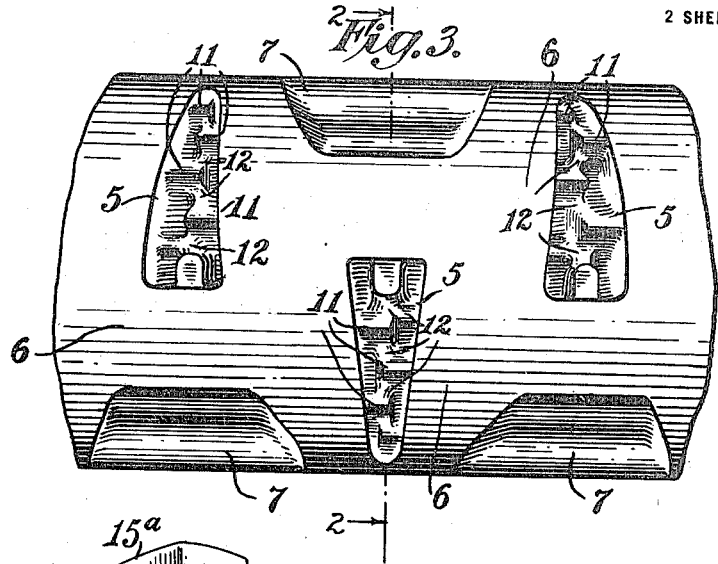
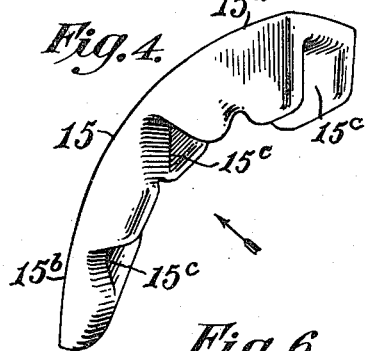
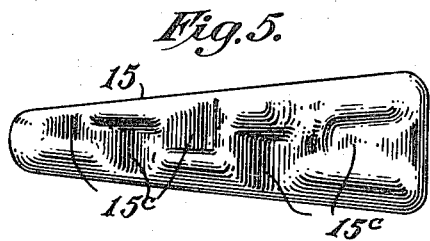
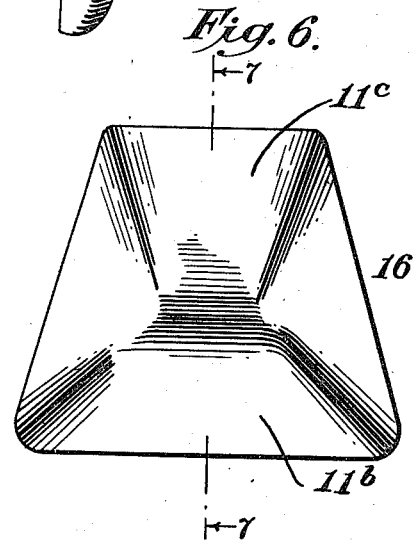
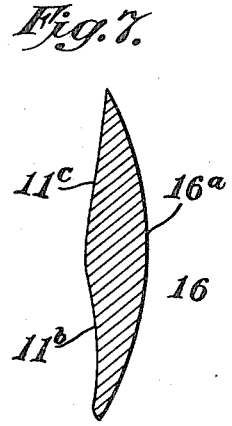
Attest:
Robert S. Mayer
Havell D. Boyd
Inventor:
by Max Cyrus Overman
E. W. Scherr Jr. Atty.

UNITED STATES PATENT OFFICE.

MAX CYRUS OVERMAN, OF NEW YORK, N. Y.

PNEUMATIC TIRE.

1,177,048.  Specification of Letters Patent.  Patented Mar. 28, 1916.

Application filed July 22, 1914. Serial No. 852,407.

*To all whom it may concern:*

Be it known that I, MAX CYRUS OVERMAN, a citizen of the United States, residing at New York city, in the county of New York and State of New York, have invented certain new and useful Improvements in Pneumatic Tires, of which the following is a specification.

My present invention relates to a pneumatic tire having a deep nose-portion with deep tread clefts therein, containing a special adaptation of integral projections which prevent its bending strains from creating breaks in the relatively thin layer of nose material forming the bottoms of the clefts; and which create a condition of mutual support through said projections between the load-bearing parts of the tire adjacent said clefts.

In the drawings showing an embodiment which my invention may take, Figure 1 is a fragment in side elevation of a pneumatic tire within my invention, Fig. 2 is a cross sectional view on the line 2—2 in Fig. 3, which latter is a plan view of the tread of the same tire; Fig. 4 is a perspective view on an enlarged scale compared to the previous figures, of one of the cores or inserts used in the manufacture of this tire for forming one of the transverse grooves, together with the pebble ejecting projections; Fig. 5 is an underneath view of the same insert, namely, a view looking at it in the direction of the arrow in Fig. 4; Fig. 6 is a similarly enlarged perspective view of one of the cores or inserts used by forming the recesses 7; and Fig. 7 is a section on the line 7—7 in Fig. 5.

I will now describe the specific devices of the drawings, reserving it to the claims to point out the novel features and to define the scope of the invention, it being understood that the claims will be given the due range of equivalents to which they may be entitled in view of the art.

The expressions herein directed to the up and down relationship of the parts of the tire refer to a section of the tire positioned as if in ground contact as in Fig. 2.

1 is a protective shoe for the inner tube (not shown) of a pneumatic tire. It comprises the ordinary fabric carcass 2 and my improved, nose-portion 3 greatly thickened as compared with the ordinary shoe, thereby so far separating the tread of the shoe from the inner tube as to minimize the liability of puncture.

4 is a fabric breaker strip. The nose portion may be made of the regular pneumatic tire tread stock or any other rubber compound or compounds suitable for the purpose.

5—5 are frequently occurring grooves substantially as deep as the nose-portion, extending alternatively from the sides of the shoe past the center of the tread (compare the plan view Fig. 3) in order to overlap each other. Said grooves become increasingly wide as they approach the tread and are especially wide at said tread. In this way, the deep nose-portion is sub-divided into numerous load-supporting parts 6 having flexibilities and abilities to flow and yield in every direction, longitudinally or laterally, thereby assisting in preventing the deep nose-portion from being torn off the carcass, when the tire is in action.

7—7 are large area recesses or weakenings formed in the sides of the respective load-supporting parts 6. These recesses are deepest at a zone located between their top and bottom boundaries 8 and 9, and thence graduate in depth toward said boundaries and also graduate in depth toward their said boundaries; and at these boundaries the bottoms of the recesses meet with the rounded surface of the tire. Further, the side boundaries 10—10 of the individual recesses converge toward the tread.

The relatively massive nose-portion of my tire would throw undue bending work on the upper side walls, were it not for these large area recesses 7—7, which, as will be seen from a consideration of Fig. 2, act to distribute the bending so that it occurs throughout the height of the side walls of the tire instead of concentrating destructively in any one zone in said walls. Further, by permitting an easy distribution of the stresses created in the tire when in action, these same recesses 7 coöperate with the grooves 5 in preventing the nose-portion from tearing loose from the carcass.

11—11 are pebble ejecting nipples or projections extending integrally from the bottom and sides of each groove 5. Their bases are merged with one another and with the walls of each groove by connecting fillets 12 which perform the important service of preventing the bending strains on the load-supporting parts 6 from creating breaks or cracks through the relatively thin layer of nose material forming the bottoms of the grooves 5. It is important to avoid these cracks because, should they occur, water will get through them into the fabric of the carcass and will rot it. Further, these same connecting fillets create under load a condition of mutual support not only between the individual projections 11—11 but also through them, between the long walls of the grooves 5 so that adjacent load-supporting parts 6 are just enough tied together under load to make them act together as a unit (which is advantageous from the point of view of wear and firmness and steadiness of support) without impairing the advantageous qualities heretofore referred to for which the grooves 5 are provided.

15 in Figs. 4 and 5 is the core or insert used in the manufacture of the tire for forming one of the grooves 5 with the projections 11 and the fillets 12. When used to make one of said grooves in the tire, the portion 15$^a$ of the insert is located at the central tread-portion of the tire in course of manufacture, and the portion 15$^b$ is located at the side of the tire, whereas the recesses 15$^c$ form the projections or nipples 11 and the fillets 12.

16 in Figs. 6 is a face view of the insert used in forming one of the recesses 7; and Fig. 7 is a section of the same on the line 7—7 in Fig. 6. The concealed face of this insert in Fig. 5 being the curved face 16$^a$ in Fig. 7, is located at the curved outer periphery of the tire being manufactured; whereas 11$^b$ is the lower bottom portion and 11$^c$ its upper bottom portion.

What I claim is:—

1. A pneumatic tire comprising a carcass and a rubber nose-portion divided by frequent grooves into yielding load-supporting parts, each of said grooves containing projections whose bases are filleted and merged with one another and with the walls of the grooves.

2. A pneumatic tire comprising a carcass and a deep rubber nose-portion divided by frequent grooves substantially as deep as the nose-portion into yielding load-supporting parts, each of said grooves containing projections whose bases are filleted and merged with one another and with the walls of the grooves.

3. A pneumatic tire comprising a carcass and a deep rubber nose-portion divided by frequent transverse grooves substantially as deep as the nose-portion into yielding load-supporting parts, each of said grooves containing projections whose bases are filleted and merged with one another and with the walls of the grooves.

4. A pneumatic tire having a nose portion provided with grooves forming yielding load-supporting parts, spaced over lapping projections in the grooves springing alternately from the opposite walls thereof, and fillets connecting the bases of the overlapping portions of said projections.

In testimony whereof I have affixed my signature in the presence of two witnesses.

MAX CYRUS OVERMAN.

Witnesses:
  Howell D. Boyd,
  E. W. Scherr, Jr.

Copies of this patent may be obtained for five cents each, by addressing the "Commissioner of Patents, Washington, D. C."